Oct. 17, 1967  B. J. AUGEROT  3,347,383
FILTER PRESS
Filed Nov. 19, 1965  3 Sheets-Sheet 1
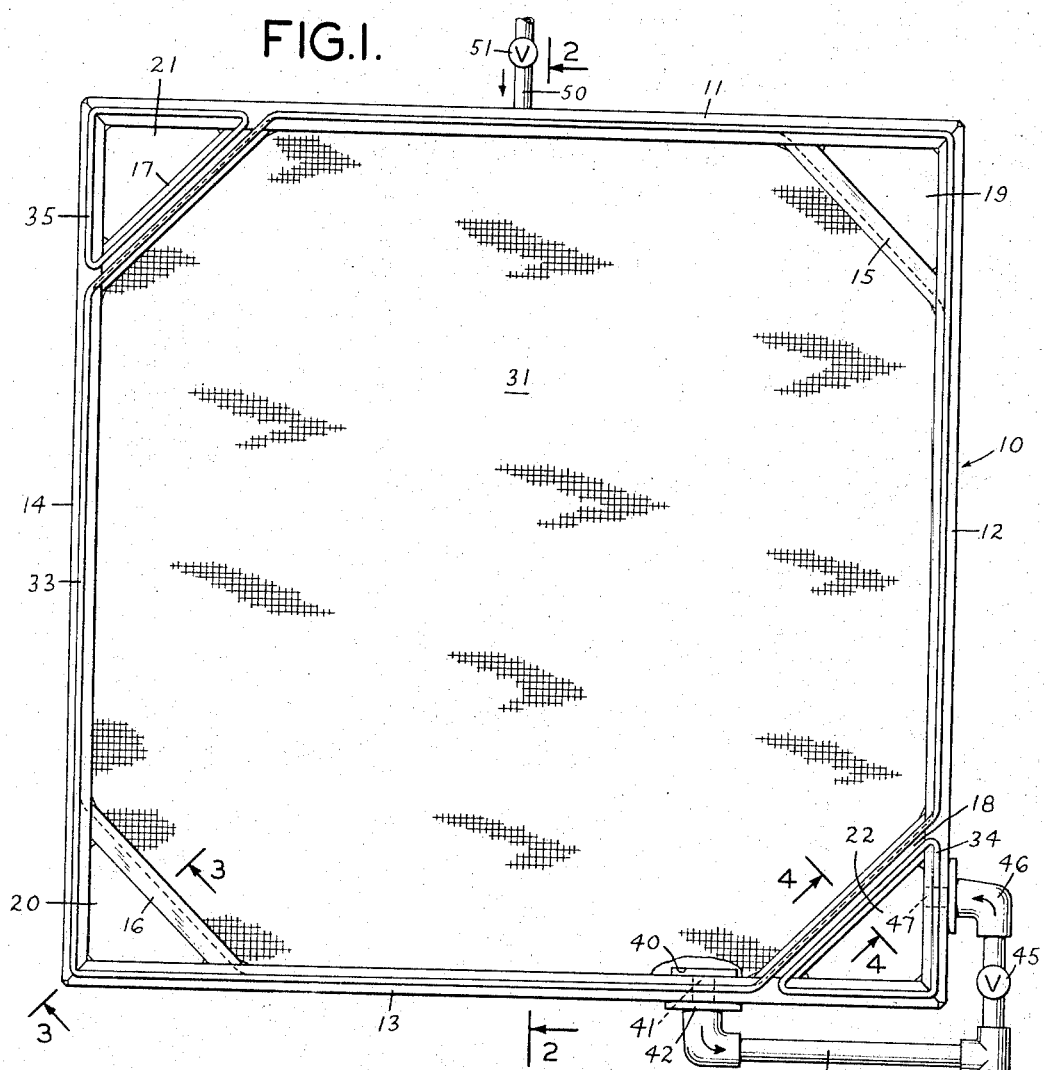
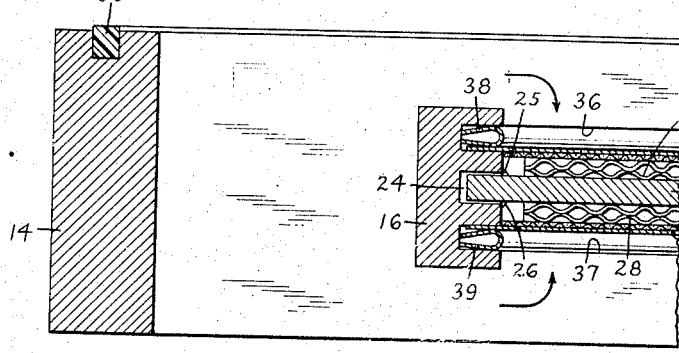
INVENTOR
BERNARD J. AUGEROT
BY
HIS ATTORNEYS Oct. 17, 1967   B. J. AUGEROT   3,347,383
FILTER PRESS
Filed Nov. 19, 1965   3 Sheets-Sheet 2
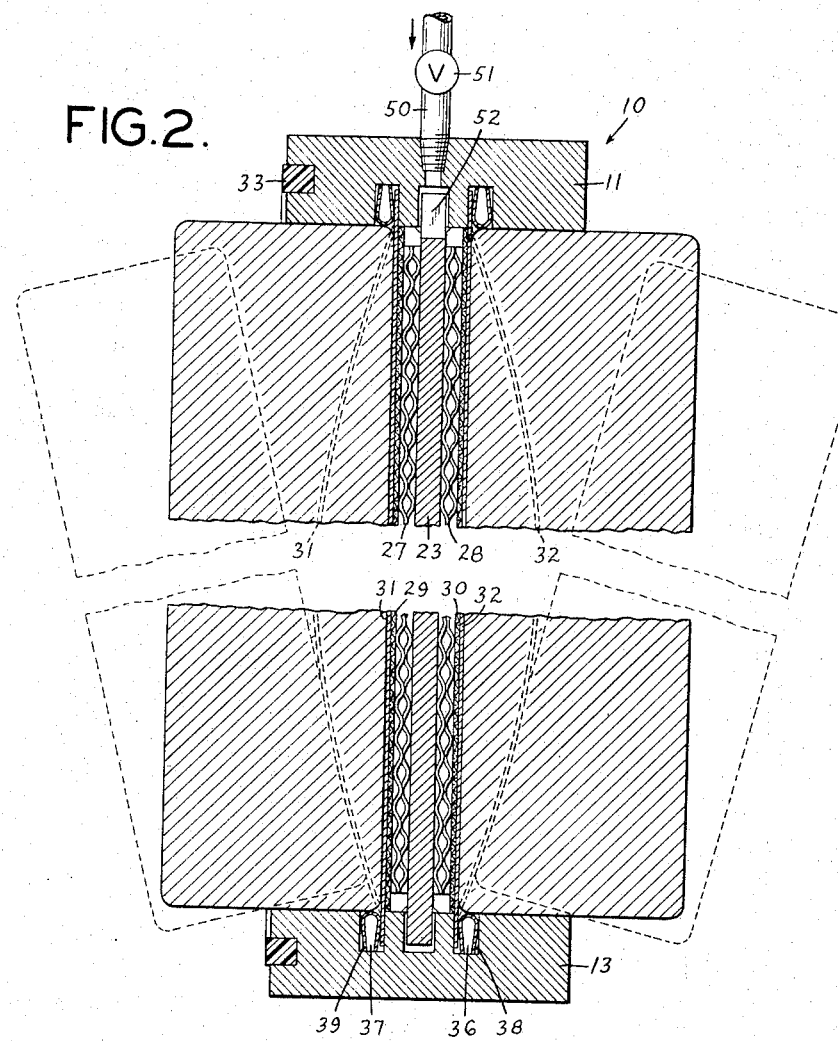
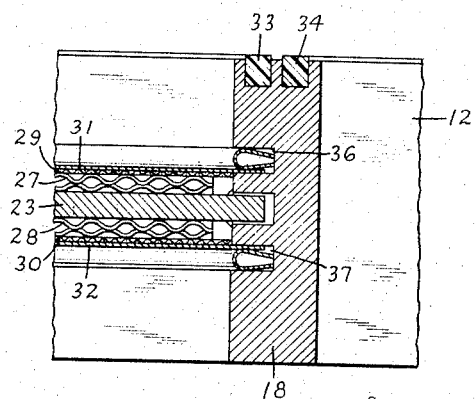
INVENTOR
BERNARD J. AUGEROT
BY
HIS ATTORNEYS Oct. 17, 1967  B. J. AUGEROT  3,347,383
FILTER PRESS Filed Nov. 19, 1965  3 Sheets-Sheet 3

INVENTOR
BERNARD J. AUGEROT
BY
Brumbaugh Free, Graves + Donohue

HIS ATTORNEYS

United States Patent Office 3,347,383
Patented Oct. 17, 1967

3,347,383
FILTER PRESS
Bernard J. Augerot, Morris Township, Morris County, N.J., assignor to T. Shriver & Company, Incorporated, Harrison, N.J., a corporation of New Jersey
Filed Nov. 19, 1965, Ser. No. 508,668
2 Claims. (Cl. 210—225)

ABSTRACT OF THE DISCLOSURE

Filter plates for filter presses having filter cloths and being characterized by connections enabling the filtrate discharge outlet of the plate to be closed while gas is supplied to the filter plate for flexing the filter cloths to discharge filter cake, the plates having caulking strips pressed into grooves in the interior periphery of the filter plate to retain the filter cloths against dislodgement by the gas pressure, and sealing strips on one face of the plate for engaging an ungasketed surface of an adjacent plate in sealing relation.

---

This invention relates to improvements in filter presses and more particularly to the filter plates for filter presses from which filter cake can be readily discharged.

Filter presses are widely used in many different industrial fields. In the conventional plate or plate and frame types of filter presses, the solids are removed from the liquid or filtrate by means of cloths which are draped over the faces of the plates in such relation that when a solids-containing liquid is forced into contact with the filter cloths, the solids are retained on the cloth while the filtrate flows through the cloth and is discharged from the filter press.

One of the problems encountered in the operation of filter presses is the removal of the solids or filter cake from the plates of the filter press and the filter cloths thereof. Usually the solids are packed against the cloth and the cake is not readily stripped from the cloth. For complete removal of the cake, it is frequently necessary to force jets of water against the cloth and the cake thereon to remove the cake. Various systems have been provided for separating the cloth from the filter plate in order to more readily expose the filter cake for removal, but none of these systems has been completely satisfactory for enabling ready removal of the filter cake.

In accordance with the present invention, filter plates are provided in which the filter cloths are securely attached to the filter plate and means is provided for flexing the cloths and thereby dislodging the filter cake. In this way, scraping or hydraulic removal of the cake is avoided and a much cleaner and efficient operation of the filter press is obtained.

More particularly, in accordance with the present invention, the filter plates may be provided with self-contained inlets and outlets which are arranged to be in communication with each other when the filter press is in condition for operation to enable a more uniform distribution of the solids-containing material across the filter plate cloth and a much more convenient discharge of the filtrate therefrom. Moreover, air pressure means is provided for flexing the filter cloths to detach and discharge the filter cake from the filter cloths when the filter plates are separated.

Figure 5:
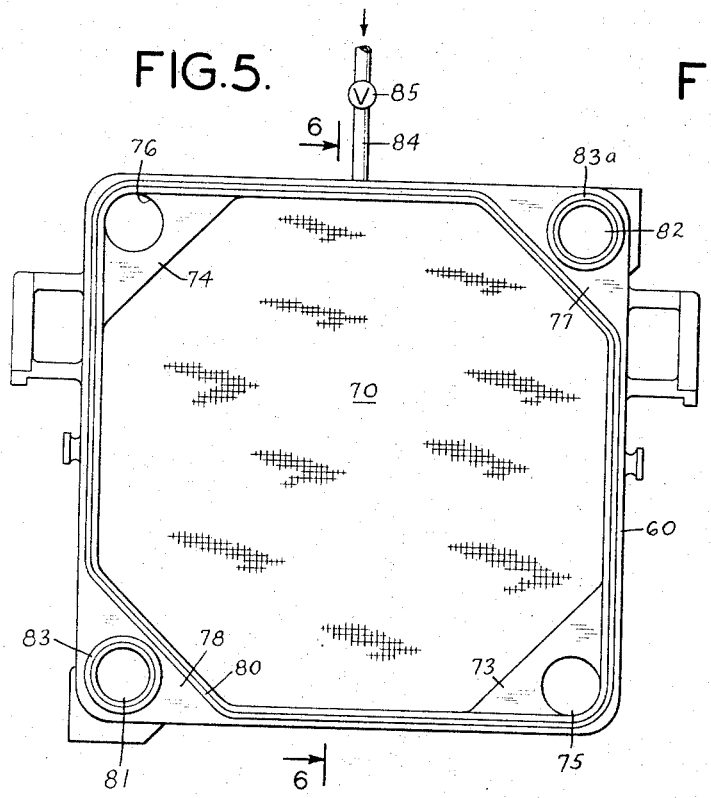
Figure 6:
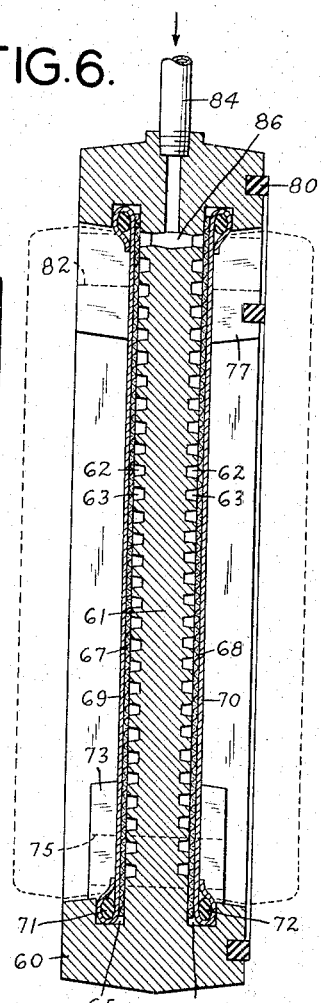

For a better understanding of the present invention, reference may be had to the accompanying drawings, in which:

FIGURE 1 is a front elevational view of a fabricated filter plate embodying the present invention;

FIGURE 2 is a view in section taken on line 2—2 of FIGURE 1;
FIGURE 3 is a view in section taken on line 3—3 of FIGURE 1;
FIGURE 4 is a view in section taken on line 4—4 of FIGURE 1;
FIGURE 5 is a front elevational view of a modified form of filter plate embodying the invention;
FIGURE 6 is a view in section taken on line 6—6 of FIGURE 5; and
FIGURE 7 is a schematic illustration of a filter press.

Figure 7:
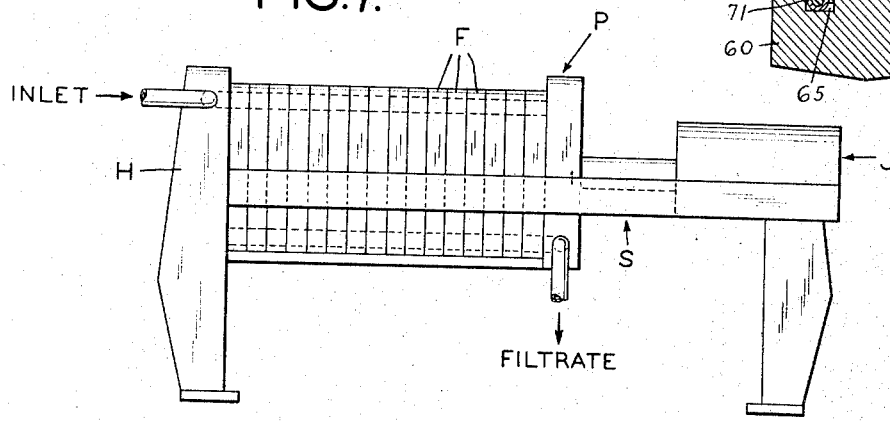

It will be understood that a filter press as shown schematically in FIGURE 7 may include a fixed head H mounted on a supporting frame S which carries a series of filter plates F in side-by-side relation and which can be clamped together by means of a movable head plate P also carried by the frame and actuated by means of a hydraulic or pneumatic jack J to maintain the plates in substantially face to face and leak-proof relation. The plates can be separated either by means of an automatic plate shifting device of which many different types are known, or they may be moved apart manually after the retraction of the movable head of the filter press.

Referring now to FIGURE 1, a typical filter plate F embodying the present invention includes a rectangular or a square frame 10 having four straight side pieces 11, 12, 13 and 14 formed of steel bar or strip, stainless steel or other corrosion-resistant metal, the strips having their corners mitered and welded together to form a rigid self-sustaining frame of substantial depth. Spanning the corners of the frame 10 are diagonal frame members 15, 16, 17 and 18 which define inlet passages 19 and 20 and outlet or discharge passages 21 and 22. Referring now to FIGURE 3, it will be seen that the diagonal 16 which corresponds to the diagonal frame member 15 is of substantially less width than the frame members 13 and 14 to which the diagonal is welded at its ends. The diagonal frame members 17 and 18 are of the same width as the frame members 12 and 13 and 14 and 11 to which they are welded at their ends. The frame members 11 to 14 and the diagonal frame members 15 to 18 define an octagonal-shaped inner area which is spanned by a partition plate 23 having its edges received in a groove 24 which extends completely around the inner periphery of the frame 10 to position the partition plate about midway of the height of the frame 10. Welded or brazed seams 25 and 26 fix the partition plate rigidly in the frame 10.

On opposite sides of the partition plate are located channel-containing members 27 and 28 formed, for example, of expanded metal, such as steel, stainless steel, "Monel" and the like, depending upon the intended use of the filter plate. The expanded metal members 27 and 28 may be tack-welded or otherwise secured to the partition plate 23. Outwardly of the channel-containing members 27 and 28 are layers of fine mesh screen 29 and 30, also formed of steel, stainless steel, Monel or the like. The screens may be secured to the channel-containing members 27 and 28 or may merely rest on top of them. Overlying the screens 29 and 30 are filter cloths 31 and 32 formed of a woven fabric, such as, for example, a fabric woven of polypropylene fibers so that it is resistant to the action of most liquids and, moreover, is flexible and stretchable, for a purpose to be described.

On one side of the frame 10 is a sealing gasket 33 which, as best shown in FIGURE 1, extends across the frame member 18, lengthwise along the frame member 13 to its corner, along the frame member 14, across the frame member 17, along the frame member 11 to its corner and along the frame member 12 to the member 18. The gasket 33 preferably is endless. Separate gaskets 34 and 35 bound the discharge or outlets 21 and 22. Gasket 34 extends along the face of the diagonal member 18 and the adjacent ends of the frame members 12 and 13. Gasket 35 extends along the diagonal member 17 and the adjacent corners of the frame members 11 and 14. It will be understood that when two plates F are brought into face-to-face relation, the gasket 33 will render the joint between the plates leak-proof while the gaskets 33, 34 and 35 will isolate the outlets 21 and 22 from the remaining area within the frame. Because the gasket material is seated in and retained by grooves which prevent the gaskets from blowing outward under pressure, this construction prevents leakage between adjacent plates at pressures up to 300 p.s.i.

Referring back to FIGURES 2, 3 and 4, it will be noted that the filter cloths 31 and 32 extend into grooves 36 and 37 which extend around the inner periphery of the frame 10 along the frame members 11 to 14 and the inner surfaces of the diagonal frame members 15 to 18. Spring strips 38 and 39 or other suitable caulking means are forced into the grooves 36 and 37 around the entire periphery of the filter cloths 31 and 32 to retain their edges securely in the grooves.

From the preceding description, it will be apparent that when a series of plates are held in face-to-face relation, all of the inlet passages 19 and 20 of the series of plates will be in alignment and in communication. Also, all of the outlets 21 in the series of plates will be in alignment and in communication but, as thus far described, none of the outlets communicate with the filter cake receiving recesses outwardly of the cloths 31 and 32. In order to enable filtrate to be discharged from the plates, the partition plate 23 has a notch 40 in one edge which communicates with a passage 41 through the frame member 13 which is connected by means of a coupling 42, a pipe 43, a T coupling 44, a valve 45 and elbow 46 to a passage 47 through the frame member 12 communicating with the outlet 22. A similar connection may be provided to the outlet 21 but such a connection is not shown herein.

Connected to the T 44 is another conduit or pipe 48 provided with a valve 49 through which air under pressure may be supplied for a purpose to be described. Also, as shown in FIGURES 1 and 2, the frame may be provided with another pipe 50 having a valve 51 therein through which air may be supplied through a notch 52 in the edge of a partition plate inwardly of the filter cloths 31 and 32.

When a solids-containing liquid is supplied to the communicating inlet ports 19 and 20 of the adjacent filter plates and the valve 45 of each plate is open, the liquid flows around the narrower bars 15 and 16 against the outer surfaces of the filter cloths 31 and 32. The liquid or filtrate passes through the cloths, the screens 29 and 30 and the channel-containing members 27 and 28 and flows outwardly through the notch 41 and associated connections into the discharge outlets 22 of the several plates to be discharged from the filter press, leaving the solids on the cloths and in the recesses between the cloths on adjacent plates. During the filtering operation, the valves 49 and 51 are closed.

When the recesses between the filter plates F are filled with solids, the plates F can be moved apart in the frame of the press and the valve or valves 45 of the plates F are then closed. The valve 51 and the valve 49, or either of these valves, selectively, are opened so that compressed air is introduced between the partition plate 23 and the filter cloths 31 and 32, causing the cloths to bow or flex outwardly, as shown in dotted lines in FIGURE 2, thereby peeling or stripping the filter cake from the cloths. In actual practice, the cakes are peeled freely from the filter cloths with little or no breakage and with little or no residue left on the filter cloths.

It will be understood that the air inlet 50 and valve 51 can be omitted and only the air inlet 48 and valve 49 used, if desired. Alternatively, the air inlet 48 and valve 49 can be omitted and the air inlet 50 and valve 51 used for discharging the filter cake. Moreover, as indicated above, a similar connection may be provided between the interior of the filter plate and the discharge outlet 21 or, if desired, this outlet can be sealed off by the omission of the connections between the interior of the frame and the outlet 22.

Additional dewatering of the filter cake may be obtained by applying air pressure to either of the air inlets while the filter plates are in face-to-face engagement and with the valve 45 of each plate 10 closed. The air pressure flexes the filter cloths slightly and thereby squeezes the cakes and discharges additional liquid from the cake or cakes.

While the filter plates of the type illustrated in FIGURES 1 to 4 are fabricated, it will be understood that filter plates embodying the present invention can be made by suitable casting and machining operations. Such a filter plate is disclosed in FIGURES 5 and 6. In this plate, the outer frame 60 and the inner partition plate 61 are cast integrally, the partition plate having a multiplicity of communicating grooves 62, 63, etc. in its outer faces. Internal peripheral grooves 65 and 66 can be machined in the rails or sides of the frame on opposite sides of the partition plate 61 to receive screens 67 and 68 for supporting the filter cloths 69 and 70. As illustrated, the filter cloths may have rope-like gaskets 71 and 72 sewn in their edges and of such dimensions that they may be forced into grooves 65 and 66 to retain the cloths therein so tightly that the air pressure used for discharging the cake will not blow the cloths out of the frame. The corners of the frame are provided wtih thicker cast portions 73 and 74 in which the inlets 75 and 76 are formed. Referring to FIGURE 6, the cast portions 73 and 74 are of less width than the width of the rails of the frame 60 so that liquid can flow readily through the inlets 75 and 76 and around the outer surfaces of the corner blocks 73 and 74 against the outer surfaces of the cloths 69 and 70.

The outlet corner blocks 77 and 78 are of the same width as the rails of the frame 60 and the discharge outlets are sealed from the cake receiving cavities on opposite sides of the plate by means of a gasket 80 which extends around the frame outside of the inlet passages 81 and 82 and along the blocks 77 and 78 inwardly of the discharge passages. Additional sealing rings 83 and 83a may be positioned around the outlets 81 and 82.

Connections of the type disclosed in FIGURES 1 to 4 may be provided between the interior of the frame and one or both of the outlets 81 and 82 in the frame. An air inlet pipe 84 with a shut-off valve 85 may also be connected with an inverted T passageway 86 for supplying air pressure behind the filter cloths 69 and 70.

With either of the types of filter press plates described herein, the filter cloths are firmly attached to the filter plates so that air pressure behind them will bow or flex them but not dislodge them from their grooves and in turn, the bowing or flexing of the filter cloths separates and discharges the filter cake in the recesses between opposing or face-to-face filter plates in the filter press.

While polypropylene cloth has been found particularly effective in filters of this type, it will be understood that filter cloths formed of other natural or synthetic fibers may also be used for filtering liquids which do not damage such fibers.

It will be understood that the size and the shape of the plates may be altered as the purpose demands and that the plates are readily adapted to either small or large filter presses and to automatic or manually operated filter presses. For these reasons, it should be understood that the forms of the invention disclosed herein are illustrative and that the invention is not limited other than as defind in the following claims.

I claim:
1. A filter plate comprising a peripheral frame, a partition plate mounted in and spanning said frame and dividing it into filter cake receiving recesses on opposite sides thereof, means containing channels therein for liquid flow therethrough on opposite sides of said partition plate, filter cloths overlying said channel-containing means and supported thereby for filtering out solids and forming filter cakes in said recesses, means for securing the peripheries of said filter cloths to said frame to retain said cloths in said frame, an inlet extending through said frame for communication with a corresponding inlet in an adjacent filter plate and communicating with both of said recesses outwardly of said filter cloths for supplying a solids-containing liquid, an outlet for liquid communicating with said recesses between said partition plate and said filter cloths for discharging liquid flowing through said filter cloths and said channel-containing means, an outlet passage extending through said frame for communication with a corresponding outlet passage in an adjacent filter plate, conduit means connecting said outlet with said outlet passage, an openable and closable valve in said conduit means for connecting and disconnecting said outlet and said outlet passage, and means for supplying gas under pressure through said outlet to said recesses between said partition plate and said filter cloths when said valve is closed for bowing said cloths relatively outwardly from said channel-containing means and discharging filter cake from said recesses.

2. The filter plate set forth in claim 1 in which said means for securing said filter cloths to said frame comprises a groove extending around the interior of and opening inwardly of said frame on each side of said partition plate for receiving the peripheral edge of a filter cloth, and a caulking strip in said groove engaging and securing the edge of said cloth in said groove against displacement thereof by said gas under pressure.

References Cited

UNITED STATES PATENTS

| | | | |
|---|---|---|---|
| 230,103 | 7/1880 | Baxley | 210—231 X |
| 1,349,238 | 8/1920 | Sweetland | 210—231 |
| 1,889,225 | 11/1932 | Sperry | 210—225 |
| 1,940,993 | 12/1933 | Borden | 210—333 X |
| 2,849,121 | 8/1958 | Burwell | 210—226 |
| 2,932,399 | 4/1960 | Emele | 210—225 |
| 3,015,395 | 1/1962 | Stram et al. | 210—231 X |
| 3,270,887 | 9/1966 | Juhasz et al. | 210—225 |
| 3,276,594 | 10/1966 | Gwilliam | 210—411 X |

FOREIGN PATENTS

| | | |
|---|---|---|
| 708,441 | 4/1965 | Canada. |
| 629,057 | 7/1927 | France. |

REUBEN FRIEDMAN, *Primary Examiner.*

C. DITLOW, *Assistant Examiner.*